S. A. STANDIFORD.
BUZZ-TOYS.

No. 195,776. Patented Oct. 2, 1877.

WITNESSES:
Gustave Dietrich
J. H. Scarborough

INVENTOR:
S. A. Standiford
BY Munn & Co
ATTORNEYS.

UNITED STATES PATENT OFFICE.

STUART A. STANDIFORD, OF PHILADELPHIA, PENNSYLVANIA, ASSIGNOR TO MRS. M. L. STANDIFORD, OF SAME PLACE.

IMPROVEMENT IN BUZZ TOYS.

Specification forming part of Letters Patent No. 195,776, dated October 2, 1877; application filed July 23, 1877.

*To all whom it may concern:*

Figure 1:
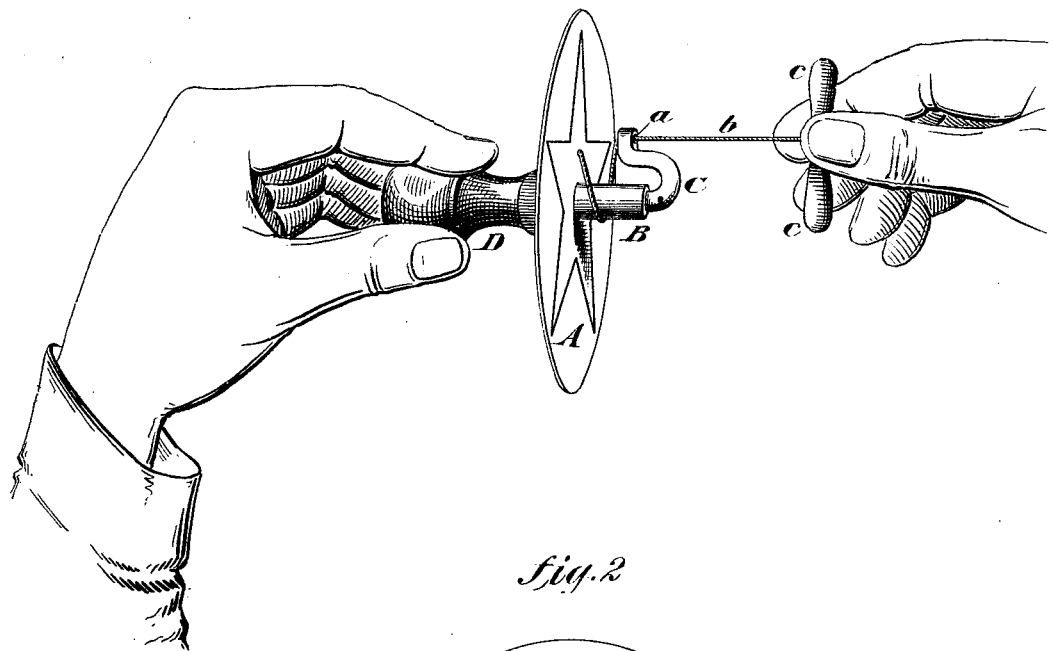
Figure 2:
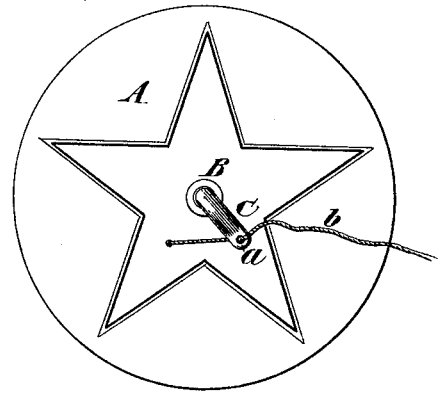

Be it known that I, STUART A. STANDIFORD, of the city and county of Philadelphia, and State of Pennsylvania, have invented a new and Improved Toy Buzz, of which the following is a specification:

Figure 1 is a perspective view. Fig. 2 is a front elevation.

Similar letters of reference indicate corresponding parts.

My invention consists of a disk secured to a sleeve which is placed on a wire attached to a suitable handle. The wire is bent over the sleeve toward the disk, and in its outer end an eye is formed, through which a cord passes that is attached to the disk and wound around the sleeve.

By pulling the cord the disk is made to rotate first in one direction and then in the other.

In the drawing, A is a disk of metal or other suitable material secured to the sleeve B, which is placed on the wire C, that projects from the handle D.

The end of the wire that projects through the sleeve is bent backward toward the handle, partly over the sleeve, and near its outer end an eye, $a$, is formed. A cord, $b$, having attached to it the handle $c$, passes through the eye $a$, and is attached to the disk A near the sleeve B.

By winding the cord around the sleeve, and pulling it quickly by means of the handle $c$, the disk is made to rotate rapidly, and the momentum acquired is sufficient to wind the cord in the opposite direction, the cord being slackened to permit it to wind freely. The cord is again pulled, and the disk rotates in the opposite direction and winds as before.

Having thus described my invention, I claim as new and desire to secure by Letters Patent—

A toy buzz consisting of a disk, A, secured to the sleeve B, the wire C, bent as described, and provided with an eye, $a$, the handle D, and cord $b$, substantially as set forth.

STUART ALGIE STANDIFORD.

Witnesses:
H. O. BUCKLEY,
HENRY SMITH.